United States Patent [19]

Boucard et al.

[11] Patent Number: 4,867,035
[45] Date of Patent: Sep. 19, 1989

[54] ACTIVATING DEVICE WITH SAFETY SYSTEM FOR A CHARGE RELEASABLE FROM A CARRIER

[75] Inventors: Jean Boucard, Boulogne Billancourt; André Delaitre, Paris; Jean Deliance, Paris; André Winaver, Paris, all of France

[73] Assignee: Thomson-Brandt Armements, Boulogne Billancourt, France

[21] Appl. No.: 235,308

[22] Filed: Aug. 23, 1988

[30] Foreign Application Priority Data

Aug. 28, 1987 [FR] France .................. 87 12036

[51] Int. Cl.⁴ .................. F42C 15/12; B64D 1/04
[52] U.S. Cl. .................. 89/1.55; 102/396
[58] Field of Search .................. 89/1.55; 102/396, 382

[56] References Cited

U.S. PATENT DOCUMENTS

| | | | |
|---|---|---|---|
| 2,382,872 | 8/1945 | Giles | 102/396 |
| 3,326,083 | 6/1967 | Johnson | 89/1.55 |
| 3,575,084 | 4/1971 | Glendenning | 89/1.55 |
| 3,610,092 | 10/1971 | Miller | 89/1.55 |
| 3,625,106 | 12/1971 | Russo et al. | 89/1.55 |
| 3,960,086 | 6/1976 | Fisher | 89/1.55 |
| 3,961,577 | 6/1976 | O'Steen | 89/1.55 |
| 4,348,936 | 9/1982 | Fukhiron et al. | 89/1.55 |

FOREIGN PATENT DOCUMENTS 0124884 11/1984 European Pat. Off. .
2145802 4/1985 United Kingdom .

*Primary Examiner*—David H. Brown
*Attorney, Agent, or Firm*—Roland Plottel

[57] ABSTRACT

A charge releasable from a carrier, such as a charge having to be activated at the moment of release, is provided with an activating device with a safety system to prevent its untimely activation. The triggering means are activated by means of the activating device comprising a cable connected to the carrier. At the moment of release, the cable controls the activating device which initiates the triggering means by means of an internal mechanical link. All the elements are placed inside the charge. Moreover, the activating device constitutes a safety device to prevent the activation of the charge so long as it is not released.

12 Claims, 4 Drawing Sheets

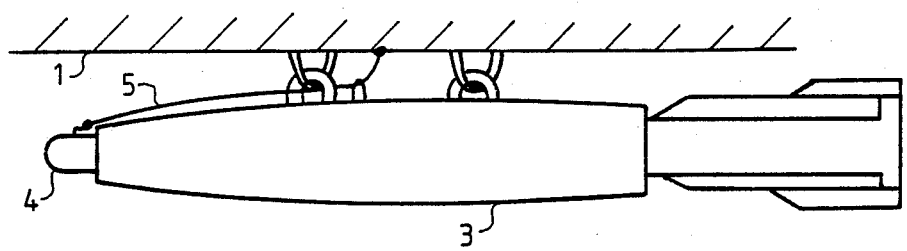
FIG_1
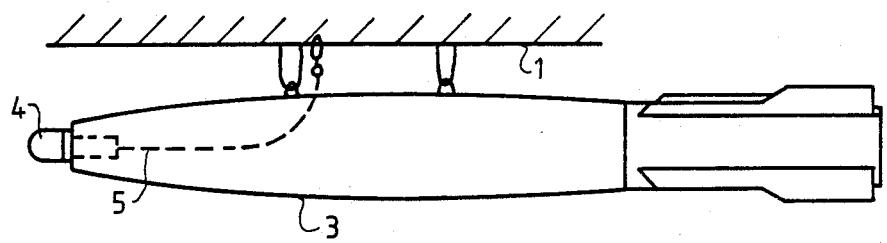
FIG_2-a
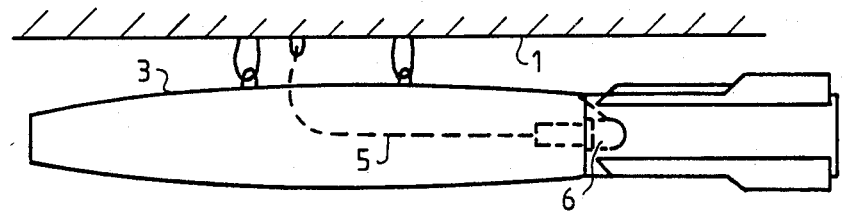
FIG_2-b
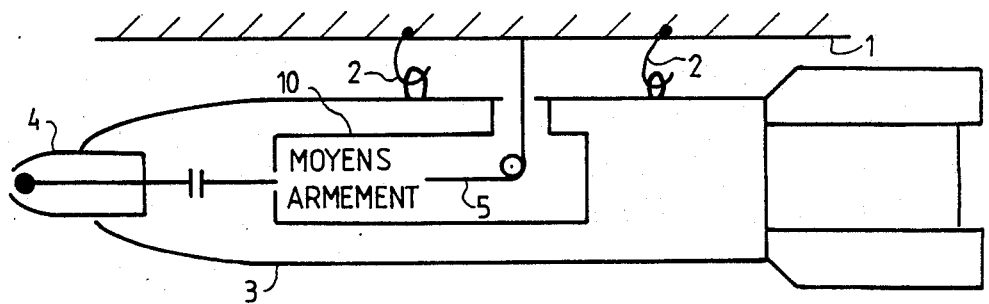
FIG_3

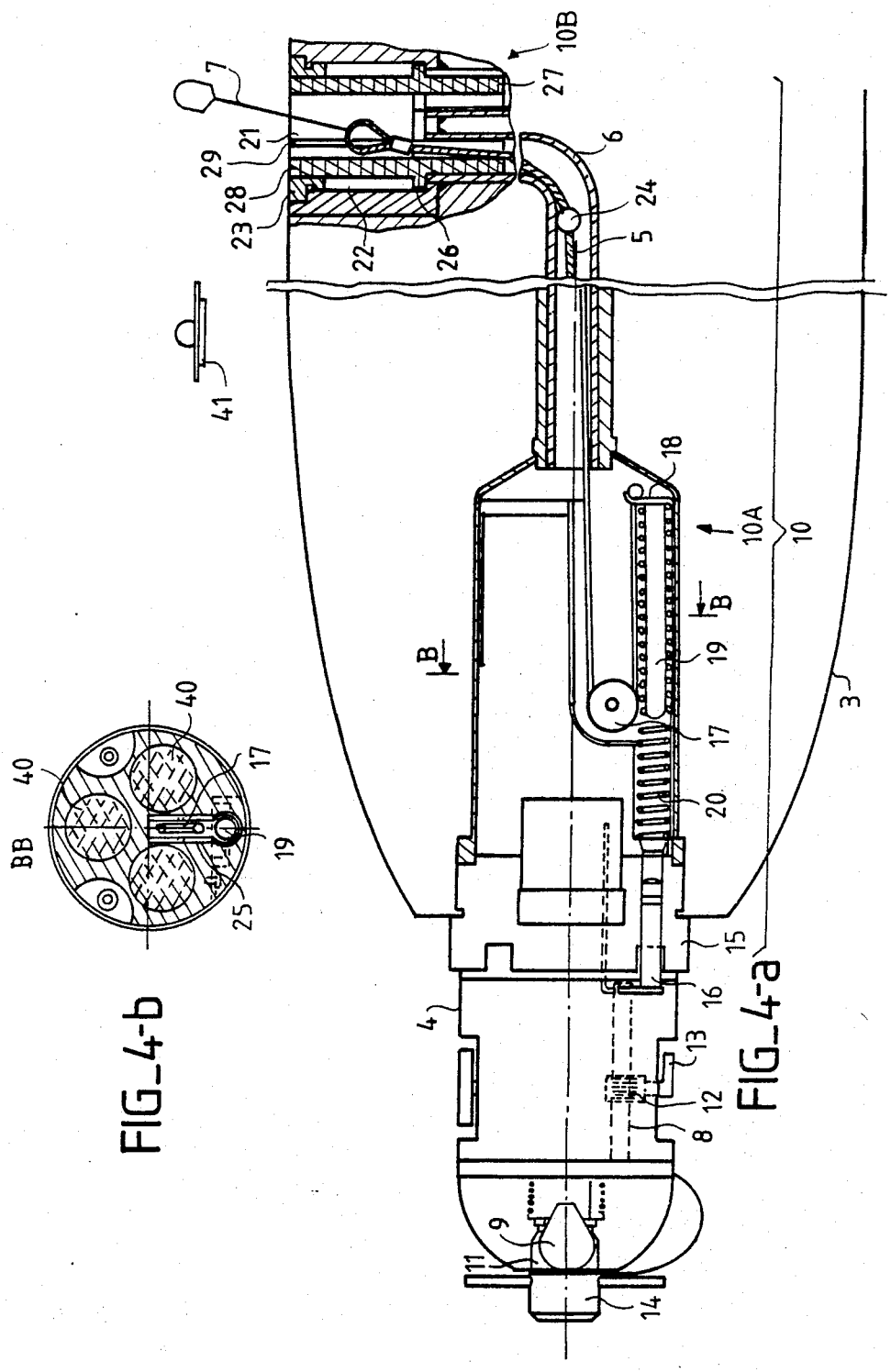
FIG_4-b
FIG_4-a

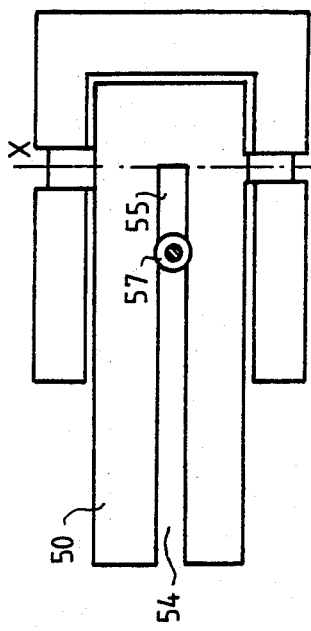
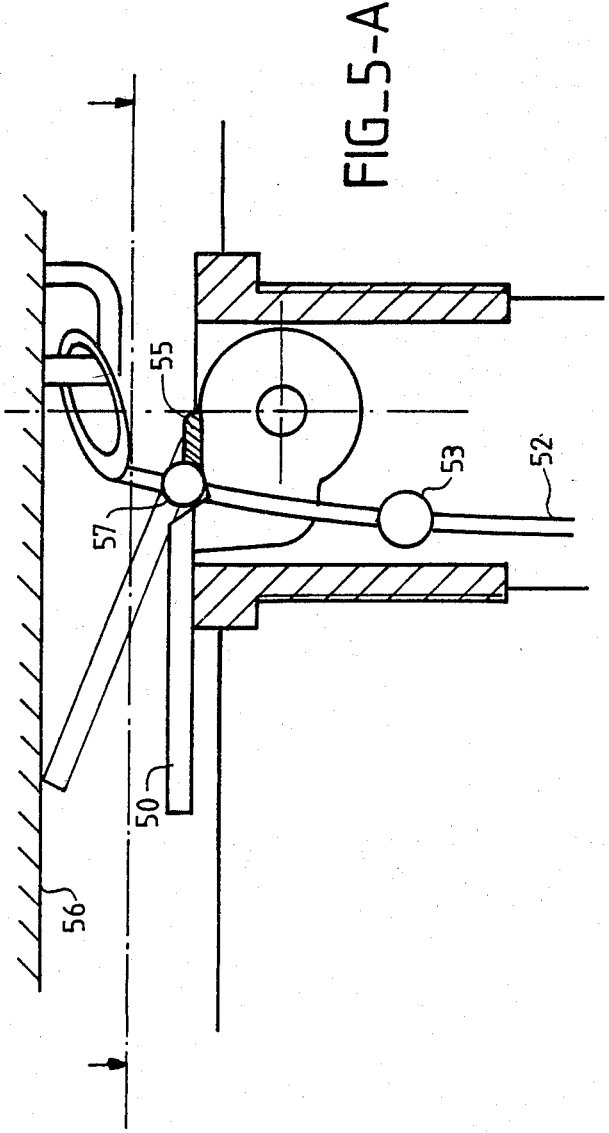

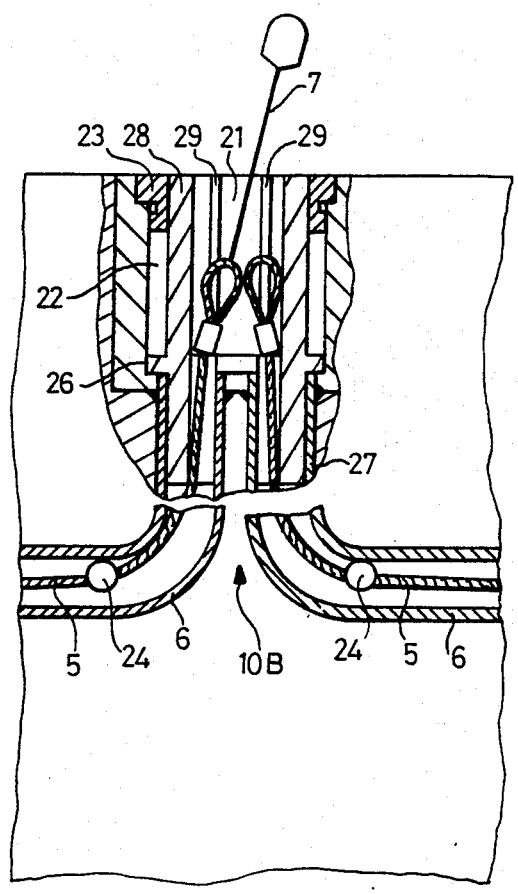
FIG_6

ACTIVATING DEVICE WITH SAFETY SYSTEM FOR A CHARGE RELEASABLE FROM A CARRIER

BACKGROUND OF THE INVENTION

1. Field of the Invention

The invention relates to charges that are releasable, for example from an aircraft to which they are fixed, and especially to a safety device for said charges to prevent their untimely activation before they are released. The invention also makes it possible to prevent the activation of these charges after their release, if they have to be released in an inert condition.

2. Description of the Prior Art

Most releasable charges, such as bombs, are provided with a number of control systems, for example firing fuses, which have to be triggered at specified moments and, especially, with a certain delay, essentially for reasons of safety, when the charge is released.

Referring to FIG. 1, when the firing fuses 4 having a trigger are placed in front of the charge 3, namely in nose assembly, they are activated from outside the charge by means of a cable 5, often called a "releasable safety" cable, hooked to the carrier 1, i.e. generally to the aircraft.

The fact that the firing cable or releasable safety cable goes outside the charge, entails the drawback wherein the fuse can be activated unexpectedly or accidentally. For, when the charge is being handled, to assemble various elements or to mount the charge on the carrier, the firing cable may be activated involuntarily. The fuse is then activated and the charge is operational: its operation can be provoked at any instant. When an explosive charge is involved, it is obvious that this type of event should not take place, or should not be capable of taking place. Similarly, for an airborne explosive charge, any object or bird may accidently cause the pulling of the cables and, hence, the activation of the fuse and, thereby, that of the charge, thus endangering the existence of the carrier.

An aim of the invention is to overcome these drawbacks and to create an activating device which is independent of the dimensions of the charge for which it is intended, and which is so designed that it can be manufactured independently of the charge and mounted on it at any instant, especially at the last moment.

The French published patent application No. 2 562 654 describes a safety device to prevent the activation of an airborne charge before its release. This device also enables inert release, i.e. release without the activation of the charge. This safety device is designed to be associated with releasing mechanism, so as to provide for effective triggering of the system only during release from the fitted-up device. This safety device has a clamp. When this clamp is open, an activating cable goes through it freely and when it is closed, it clamps said activating cable.

SUMMARY OF THE INVENTION

An object of the invention is an activating device for a charge, releasable from a carrier beneath which it is fixed, said device comprising means to trigger the firing process, said triggering means comprising a firing fuse and having to be activated by said activating device when releasing the charge, said activating device comprising:

at least one firing cable, said cable passing within the charge and being connected to the carrier;

a first part, designed to push an activating rack of said fuse and to rewind said firing cable once the activation is done;

a second part to prevent the untimely activation of the firing fuse before the charge is released.

BRIEF DESCRIPTION OF THE DRAWINGS

The invention and its characteristics will be better understood from the following description, illustrated by the appended drawings, of which:

FIG. 1 shows an airborne releasable charge provided with an activating device according to the prior art;

FIGS. 2a and 2b show an airborne releasable charge fitted with an activating device according to the invention;

FIG. 3 is a schematic diagram of the operation of the device according to the invention;

FIGS. 4a and 4b show an embodiment of the device according to the invention installed in a releasable charge;

FIGS. 5a and 5b show another embodiment of part 10B of the device according to the invention;

FIG. 6 shows a variation of the embodiments of FIGS. 4a and 4b

DETAILED DESCRIPTION OF THE PREFERRED EMBODIMENTS

We shall now refer to FIGS. 2a and 2b which respectively show a charge 3 in nose assembly, namely with means to trigger the firing process, such as a fuse 4, placed in front of the charge and a charge 3, with a tail assembly, namely with an firing fuse 6 placed behind the charge. It is seen that, in both these cases, a firing cable 5 is fixed, firstly on the carrier 1 and, secondly, on the fuse 4, i.e. fixed to the triggering means. According to the invention, this firing cable penetrates the inside of the charge 3 immediately and as close as possible to reach the fuse 4 through a path which is entirely inside the charge.

Referring to FIG. 3, activating means 10 are interposed inside the charge 3 and the firing cable 5 acts on these means. When the charge is being released, the firing cable 5, fixed to the support 1, acts on this activating device which mechanically activates the triggering means 4 and, more precisely, the firing fuse. This activating device also constitutes a safety device which prevents any untimely and involuntary activation of the firing fuse 4.

FIG. 4a is a partial sectional view of the charge according to the invention. This figure again shows the main elements given in the other figures, except for the support and the means for hooking the charge to the support. These elements are: the charge 3 itself, the triggering means 4 which includes a firing fuse screwed to the front of the charge, the firing cable 5 and the activating device 10 placed in the center of the charge and in contact with the firing fuse 4. In this embodiment, the activating device is divided into two parts. A first part 10a is placed in mechanical contact with the firing fuse 4, and is centered like it on the longitudinal axis of the charge. The second part of the activating device is marked 10b and is placed at the position where the firing cable 5 leaves the charge, namely at the surface of this charge facing the lower part of the carrier. The housing in which the first part 10a of the this activating device is located also exists on most current explosive charges. These two parts are connected by a conduit 6 containing the firing cable 5. This firing cable is represented herein with an extension piece 7 which is itself hooked to the support. This extension wire is chosen in such a way that it breaks under a defined mechanical tension.

The first function of the first part of the activating device 10a is to push a rack 8 of the fuse 4 and its second function is to rewind the firing cable 5 once the activation has been done. The function of the second part 10b of the firing device is to prevent the untimely activation of the fuse, namely the untimely pulling of the cable 5 or of the extension piece 7 before the charge is released.

The firing fuse 4 shown in FIG. 4a has a main part which is a feeler 9. This feeler 9 may be translated through an activating rack 8 so as to leave the front side of the firing fuse. A safety cap 14 is fixed beforehand to a hole 11, through which the feeler 9 leaves the fuse. The activating rack 8 can be reached by the rear face of the firing fuse.

This figure shows a toothed wheel 12 which is in gear with the activating rack 8, the shaft of which leaves the outside of the fuse and around which a lever 13 can pivot. It is this lever 13 which is used in the prior art devices for the activating operation. For, it is after this lever that the firing cable is attached.

The first part 10a of the activating device has a casing 15 within which an activating rod 16 can slide. This activating rod pushes the activating rack 8. At the rear end of this casing 15, there is fixed the conduit 6 in which the firing cable 5 is placed. This firing cable ends in the inside of the casing 15 to pass through the inside of a groove of a pulley 17 so as to be sent in the opposite direction to the rear of the casing. There the firing cable 5 is fixed to a washer 18 to push an activating pin 19 against the activating rod 16. The rewinding function is ensured by the fact that the activating pin 19 is placed inside a spring 20. This spring 20 and the activating pin are placed at a tangent to the two strands of the firing cable to ensure the following operation.

When the firing cable 5 is pulled with respect to its charge, its end fixed to the ring 18 compresses the spring 20 and translates the activating pin 19 towards the activating rod 16 until it pushes it by a few centimeters so as to activate the fuse.

In the general process of the functioning of the system, the firing cable 5 or its extension piece 7 is broken at a moment after release, thus causing the spring 20 returns to its initial position, and thus rewinding the cable 5 so that it does not trail behind outside the released charge.

The second part 10b of the activating device can be made as follows. In a hole 21 on the surface of the charge and through which the firing cable or its extension piece 7 leaves, a feeler sleeve 22 is placed. This feeler sleeve 22 can slide and thus come out so as to project from the charge. A limit stop 23 is provided to limit the shift. An activating ball 24 is fixed on the firing cable 5 in the conduit 6 forming an bend in the direction of the sleeve 22 in order to obtain an outlet perpendicular to the axis of the charge. The activating ball 24 is placed close to this sleeve. The charge is positioned beneath its carrier so that the feeler sleeve 22 can meet a fixed obstacle of this carrier when it leaves the charge.

This second part 10b of the activating device works as follows. When the firing cable, held back by the carrier, moves to the inside of the conduit 6, the activating ball 24 comes into contact with the inner end 27 of the feeler sleeve 22. With the movement of the cable continuing, the feeler sleeve leaves the charge until its external end 28, meets a fixed part of the carrier. This will happen if the cable is pulled with the charge still hooked to the carrier. In this case it is seen that the pulling of the cable 5 is limited by this feeler sleeve that comes to a stop against the carrier. The position of the activating ball 24 with respect to the feeler sleeve 22 and the distance of the translational motion from the feeler sleeve 22 to the carrier is calculated so that the activation cannot take place in this case, i.e. the activating rod 16 is not actuated by the activating pin 19 when the feeler sleeve comes to a stop against the carrier.

The activation of the fuse before release is therefore not possible. Also if the carrier is pushed away from this feeler sleeve, as is the case when a bomb is released, the sleeve can continue its translation motion until the activating rod completely pushes the activating rack 8. The feeler sleeve is placed inside the limit stop 23 and has a shoulder 26 placed inside the charge with respect to this limit stop 23. The distance between this shoulder 26 and the stop 23 is greater than the distance between the outer end 28 of the feeler sleeve and the carrier. This distance corresponds to the distance needed for the translation of the activating pin 19 so that the firing fuse 4 is activated. Thus, when the shoulder 26 of the feeler sleeve 22 comes against the limit stop 23, the firing cable 5 stays fixed, held there by extension piece 7, attached to the carrier, the charge being in free fall, and the extension piece 7 then breaks because its resistance to tension is insufficient to withstand the fall of the charge. From this instant onwards, the firing cable gets rewound, as described earlier.

In FIG. 4b, a cross-sectional view of the charge is shows the arrangement of the activating device 10 according to the invention. This figure shows the activating pin 19 surrounded by the spring placed at the edge of the activating device, and the pulley 17 which is placed further inside the activating device. These elements are placed inside a radial groove 25. On either side of this radial groove 25 are placed, for example on the longitudinal axis of the charge and in a perpendicular plane, slabs of explosive material 40, for example three cylindrical slabs of explosive, acting as relays between the firing means and the charge itself. They will be initiated at the moment of triggering caused by the firing fuse.

In the embodiment described, the feeler sleeve 22 is mounted around the firing cable 5 by pulling this cable to make it go through a slit 29 made in the sleeve 22.

Referring to FIGS. 5a and 5b, the part 10b of FIG. 4a of the device can be made differently. The feeler sleeve is replaced, with respect to its feeler function, by a feeling lever 50 that pivots on an axis XX' transverse to the direction of the cable 52. An activating ball 53 is still used to move the movable element. In this case, the movable element is a feeling lever 50. For, the cable 52 carrying this activating ball goes through a slit 54 of the lever, and this slit is not as wide as the ball. During the release, the cable is pulled and the activating ball 53 comes to a stop against a limit stop 55 and the edges of the slit 54, and causes the pivoting of the lever which could, if the case arises, come to a stop against the carrier structure 56, if the cable is pulled at the wrong time. A positioning ball 57 is provided above the slit 54 to position the cable 52, and brings the lever 50 back against the body 22 of the bomb after release if the cable should be brought back into the body.

The device according to the invention has certain advantages, namely the following ones.

It can be mounted so as to be completely sealed in the charge with or without the firing means, namely the fuse.

The firing fuse can be mounted so that it is mounted onto the entire charge fitted with its activating device.

Certain improvements can be made in the device according to the invention. These improvements are as follows.

A storage cap, marked 41 in FIG. 4a, can be used to plug the hole 21 of the feeler 22 imperviously. A larger adaptor can be provided on the feeler sleeve end 28 to facilitate its coming to a stop, when the case arises, on an element of the carrier.

The feeler sleeve 22 should be wide enough to be capable of placing two firing cables. For, the charge may be fitted with several activating devices, each controlling a special apparatus or a special function and should, in this case, receive several commands. This is shown in FIG. 6.

A further aspect of the invention is several triggering means which have to trigger different devices at different moments, and have several first parts 10a, and a single common second part, with all of the firing cables going inside a single feeler sleeve, as shown in FIG. 6.

Should several activating devices be mounted on one and the same charge, the firing balls 24 can have a variety of shapes so that they do not get hooked into one another.

It can also be noted that no energy is stored in the activating device used.

What is claimed is:

1. An activating device for a charge (3), releasable from a carrier beneath which it is fixed, said device comprising means to trigger a firing process, said triggering means comprising a firing fuse (4) activated by said activating device when the charge is released from said carrier, said activating device comprising:
    at least one firing cable (5), said cable passing within the charge (3) and being connectable to the carrier;
    first means (10a) for activating said firing fuse in response to activating said cable by release of said charge and for rewinding said firing cable once the activation is done;
    second means (10b) for preventing the untimely activation of the firing fuse before the charge (3) is released.

2. A device according to claim 1, wherein the triggering means trigger an airborne explosive military charge, the carrier being an aircraft.

3. A device according to claim 1, wherein said first means being implanted inside a first radial groove of said charge, and said second means being implanted in a second radial groove of said charge, and said two means being joined by a conduit with said firing cable.

4. A device according to claim 1 for a releasable charge, the firing fuse of which is parallel to the longitudinal axis of the charge, wherein said first means (10a) of the activating device is located parallel to said longitudinal axis of the charge, and in contact with the firing fuse.

5. A device according to claim 4, placed inside a charge, comprising several triggering means which have to trigger different devices at different moments and comprising several first parts and a single common second part, with all the firing cables going inside a single feeler sleeve.

6. A device according to claim 4, wherein the firing cable (5) is connected to said first means of the activating device, said first means comprising an activating pin (19) connected to said firing cable, and normally in a first position and moveable to a second position by said firing cable when the charge is released and an activating rod (16) connected between said activating pin and said firing fuse, whereby when said activating pin is moved to its second position said pin activates a rack (8) of the firing fuse.

7. A device according to claim 6 wherein said first means further comprises spring means connected to said firing cable for normally urging said activating pin in said normal first position; for being compressed when the charge is first released and said firing cable moving to an activation position by tension on said cable as said charge moves away from said carrier; and for returning to its normal state after said cable is released from said carrier thereby bringing said firing cable inside said charge.

8. A device according to claim 4, wherein said second means comprises a feeler lever with a slit, said lever pivoting on an axis perpendicular to the cable, said cable passing through said slit, an activating ball being fixed to the cable at a short distance from the feeler lever, the slit being less wide the activating ball so that, when the cable is pulled, the activating ball drives the feeler lever to rotate.

9. A device according to claim 8, further comprising a positioning ball which is fixed to the cable above the slit to position and bring back the cable.

10. A device according to claim 4, wherein said second means of the activating device comprises a feeling sleeve surrounding the firing cable at the place where said cable leaves the charge, and an activating ball fixed to the firing cable, at a short distance from the feeling sleeve, the firing cable forming a bend between these two elements so that, when the firing cable is drawn, the activating ball pulls the feeler sleeve towards the outside of the charge.

11. A device according to claim 10, wherein said feeler sleeve has a shoulder which, when the firing cable is pulled, comes to a stop against a limit stop fixed to the charge, so as to cause a break in the firing cable connection to the carrier when the charge is released.

12. A device according to claim 11 wherein said firing cable 5 further comprises an extension piece 7 for joining the cable to the carrier, and is the extension piece which provides said break.

* * * * *